US006754639B2

(12) United States Patent
Ginsberg

(10) Patent No.: US 6,754,639 B2
(45) Date of Patent: *Jun. 22, 2004

(54) FIXED INCOME PORTFOLIO INDEX PROCESSOR

(75) Inventor: Philip Myron Ginsberg, Calabasas, CA (US)

(73) Assignee: CFPH, LLC, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 419 days.

This patent is subject to a terminal disclaimer.

(21) Appl. No.: 09/225,537

(22) Filed: Jan. 4, 1999

(65) Prior Publication Data

US 2002/0019789 A1 Feb. 14, 2002

Related U.S. Application Data

(63) Continuation of application No. 08/396,422, filed on Feb. 28, 1995, now Pat. No. 5,774,880, which is a continuation of application No. 07/897,377, filed on Jun. 10, 1992, now abandoned.

(51) Int. Cl.[7] .......................... G06F 17/60; G06F 15/21; G07B 17/60
(52) U.S. Cl. ......................................... 705/36; 364/408
(58) Field of Search ............................... 705/36, 35, 4; 364/408

(56) References Cited

U.S. PATENT DOCUMENTS

| 4,334,270 A | * | 6/1982 | Towers .................... 705/36 |
| 4,566,066 A | * | 1/1986 | Towers .................... 705/36 |
| 4,674,044 A | | 6/1987 | Kalmus et al. |
| 4,722,055 A | | 1/1988 | Roberts |
| 4,750,121 A | | 6/1988 | Halley et al. |
| 4,752,877 A | * | 6/1988 | Roberts et al. ............... 705/35 |
| 4,903,201 A | | 2/1990 | Wagner .................... 364/408 |
| 4,969,094 A | | 11/1990 | Halley et al. |
| 4,975,840 A | | 12/1990 | DeTore et al. |
| 5,132,899 A | | 7/1992 | Fox |

(List continued on next page.)

FOREIGN PATENT DOCUMENTS

| EP | 04 434 877 A1 | 7/1991 | |
| EP | 0573991 | * 9/1993 | ........... G06F/15/30 |

OTHER PUBLICATIONS

"Parsimonious Modeling of the Yield Curve" — Nelson, C & Sigel A. *The Journal of Business* — University of Chicago vol. 60 No. 4 (Oct., 1987) (pp 473–489).*
Chance, Don "Intro. to Derivatives"(4th ed) 1989.*
D. Leinweber, 'Knowledge–Based Systems for Financial Applications' 1988, p. 18–31, vol. 3 No. 3, I.E.E.E. Expert, New York, NY.
T. M. Patel and G. E. Kaiser, 'The SPLENDORS Real Time Portfolio Management System', Oct. 1991, p. 73–78, Proceedings of the First Int'l Conference of Artifical Intellegence on Wall Steet, NY, NY.

(List continued on next page.)

*Primary Examiner*—Geoffrey Akers
(74) *Attorney, Agent, or Firm*—Fish & Neave; Joel Weiss

(57) ABSTRACT

A data processing system receives a continuous stream of real time transactional data regarding market transactions of fixed income securities. The incoming data is qualified and then used to determine the term structure of interest rates based on price information. The system provides linear interpolation techniques to complete an operative data set. This set is updated with current trade data, with term structure shifting using pivot points from newly qualified data. An index value for a pre-select portfolio of securities is then calculated and expressed in terms of price relative to par, yield to maturity and duration.

49 Claims, 6 Drawing Sheets

U.S. PATENT DOCUMENTS

| | | | | |
|---|---|---|---|---|
| 5,214,579 A | * | 5/1993 | Wolfberg et al. | 364/408 |
| 5,774,880 A | * | 6/1998 | Ginsberg | 705/26 |
| 5,806,048 A | | 9/1998 | Kiron et al. | 705/36 |
| 5,812,987 A | * | 9/1998 | Luskin et al. | 705/36 |
| 5,857,176 A | * | 1/1999 | Ginsberg | 705/36 |
| 5,946,666 A | * | 8/1999 | Nevo et al. | 705/36 |
| 5,946,667 A | * | 8/1999 | Tull, Jr. et al. | 705/36 |
| 5,950,176 A | * | 9/1999 | Keiser et al. | 705/37 |
| 5,987,435 A | * | 11/1999 | Weiss et al. | 705/36 |
| 6,003,018 A | * | 12/1999 | Michaud et al. | 705/36 |
| 6,088,685 A | | 7/2000 | Kiron et al. | 705/36 |

OTHER PUBLICATIONS

L. Koflowitz, 'Bond Boom Yields High Interest In Fixed–Income Systems', Sep. 1989, p. 40–56, vol. 6 No. 12, Wall Street Computer Review, US.

C. Dialynas, 'The Active Decisions In The Selection Of Passive Management And Performance Bogeys', 1987, p. 19–33, Adavances in Bond Analysis & Portfolio Strategies, IL, US.

Software To Control Fixed Income Portfolios, Feb. 1986, p. 46–52, vol. 3 No. 5, Wall Street Computer Review, US.

H. Bannister, 'Portfolio Optimasation in the Money Market', Sep. 8–11, 1987, p. 558–577, Australian Computer Conference, Melbourne, Victoria, Australia.

H. M. Byramji, 'Software Packages Assist Diverse Needs of Bond Portfolio Managers', Jun. 1985, p. 61–65, vol. 2 No. 8, Wall Street Computer Review, US.

P. J. Brennan, 'Software Advance Distills 'Order' From Market 'Chaos'', Mar. 1989, p. 14, 16, 63–64, vol. 6 No. 6, Wall Street Computer Review, US.

M. Asner, 'Software Stockpickers', Sep. 1984, p. 138–142, vol. 57 No. 9, Canadian Business, CA.

Chicago Mercantile Exchange Interest Rate Products—Futures: Referring to the Eurodollar futures contract developed and introduced by CME in 1981.

CBOT X–Funds Information Pamphlet (2001).

Eurex Corporate Profile (Eurex was created Dec., 1996) <http://www.eurexchange.com/entrancehall/about_world-leading_en.html> (accessed Aug. 12, 2002).

Ho, T., *Strategic Fixed–Income Investment*, Chapters 9–10, Dow Jones–Irwin Publications, Homewood, Illinois (1990).

LIFFE History (LIFFE was established Dec. 1996) <http://www.liffe.com/why/history/history.htm> (accessed Aug. 12, 2002).

Nelson, Charles R. and Andrew F. Siegel, "Parsimonious Modeling of the Yield Curve," University of Chicago Journal of Business (1987, 60, No. 4).

"Shearson Lehman Bond Index (Shearson Lehman Government/Corporate Bond Index," Prudential Financial Online Glossary <http://www.prudential.com/glossary> (accessed Aug. 13, 2002).

* cited by examiner

FIXED INCOME PORTFOLIO INDEX PROCESSOR

CROSS REFERENCE TO RELATED APPLICATIONS

This is a continuation of copending, commonly assigned U.S. patent application Ser. No. 08/396,422, filed Feb. 28, 1995, now U.S. Pat. No. 5,774,880, issued Jun. 30, 1998, which is a file wrapper continuation of U.S. patent application Ser. No. 07/897,377, filed Jun. 10, 1992, now abandoned.

1. Field of the Invention

The present invention generally relates to data processing systems for tracking and manipulating data corresponding to fixed income portfolios and, more particularly, to data processing methods and apparatus directed to the real time determination of selected fixed income indices for use in accurately gauging interest rate profiles in real time and managing a specifically delineated set of automated transactions relating thereto.

2. Background of the Invention

A sizable portion of investment vehicles available in today's financial markets are universally characterized as fixed income securities. Exemplary fixed income securities will encompass government bonds, bills and notes auctioned at regular intervals by the U.S. and other foreign governments to finance governmental activities. These, of course, are some of many types of fixed income securities, others include corporate bonds, municipal bonds, etc. The common thread running between all fixed income securities is the payment of a set return to the investor over the life span of the security.

There are two forms of fixed income return to the investor. The first involves the provision of coupon payments at regular intervals, at the stated interest rate of the security. For example, a ten-year note may specify an 8% rate of interest on a $1,000 par value with coupons coming due twice each year for ten years. This translates to two $40 payments to the holder of the note for ten years with a final payment of $1040 (principal and interest). The other form of bond is called a zero coupon, or discount bond which provides no payment except for the final return of the face value of the bond at a specified date (e.g. ten years from issuance). The discount bond is sold at some fraction of its face value, with the interest rate discount being a function of this and the term of the bond.

The fixed income securities distributed by the United States Government are known as U.S. treasuries. These instruments span maturity terms of 13 to 52 weeks (T-bills), one to ten years (notes), and up to 30 years (bonds). The T-bills are pure discount securities having no coupons. All other treasuries having longer terms are coupon notes or bonds, with a defined payment cycle of semi-annual payments to the holder.

Treasuries have characteristic properties that make them especially useful for the purposes of the present invention and, therefore, are used exclusively in the following discussions, with the fundamental tenet that the principles may be applied to other types of fixed income securities without departing from the inventive concepts. One important attribute of treasuries, in the context of the present invention, is the minimal and uniform default risk; the issuance of U.S. government paper removes the default risk as a defining criteria in the relative pricing of treasuries in the market place.

Treasuries are auctioned by the U.S. government at pre-established auction dates. The price for the treasuries having a face value with a set coupon rate will define the actual yield of the security. After the auction, the treasuries enter the secondary market and are traded typically "over the counter", i.e., without a defined exchange. As inflation expectations and market conditions change, the prices of the recently auctioned treasuries fluctuate. These price changes are reflected by competing bid and ask prices communicated among brokers and dealers in the secondary market. For example, the yield of a given treasury increases as its price drops in the market reflecting an overall increase in the interest rates for that term of security.

The newly auctioned securities are traded with and in conjunction with the securities issued in earlier auctions. In this context, some securities are traded more often than others and are called the "actives"; these usually correspond to the recent issues as opposed to the older securities in the market. Indeed, some older securities are infrequently traded, creating an illiquid market that may or may not reflect the true market determined interest rate for that maturity length security.

In January, 1992, there was a total of approximately $1.7 trillion of U.S. notes and bonds outstanding. The majority of issues in dollar terms are short term. The profile of maturities (i.e., the expiration date of the security) indicates that $730 billion or 43% of the total will mature over the period between 1994 and 2002 (2 to 10 years out). Another 34% will mature in 1993 and 1994 and about 3% from 2003 and 2005 and 20% maturing between 2006 to 2021. In this context, the period between 2 and 10 years out in time incorporates a concentrated portion of the entire market.

Treasuries are sold by the government to fund projects, mandated payments and make strategic investments that cannot be paid by current receipts. Treasuries are purchased by individuals and institutions for a variety of reasons, including the protection of principal with a low risk investment vehicle and the generation of known future cash flows to fund the needs of, e.g., pension participants.

As can be realized by the foregoing description, the very size and diversity of the treasury market implicates an unprecedented level of sophistication by market participants in the pricing and transactions involving these securities. The very complexity associated with the transactions and the scale of trading undertaken by institutional participants necessitates a rigidly structured approach in trading. The capital at stake and the fluidity of future commitments make it critical to have a method of measuring the performance of portfolio managers, so that plan sponsors for the pension plans and the like can precisely determine whether the capital under their control is properly invested.

In the past, the only barometer for fixed income investing was the stated price and yield for one or more specific instruments such as the 30 year treasury bond. These yield values would be quoted on an ad hoc basis as a general measure of market position and direction. More recently, several large brokerage houses have developed different indices to track the fixed income market beyond the single price issue. For example, Shearson-Lehman American Express has developed a T-Bond index value that calculates a weighted average of every bond in circulation. Other indices exist with similar mechanisms for tracking the credit marketplace.

There are several significant drawbacks to the use of these forms of indices. The actual value is calculated at the close of the financial markets and, therefore, is not a real time determination, and, in fact, rapidly becomes stale as trading continues overseas and during the next trading day in the United States.

Other problems also exist; taking the entire market into account necessarily includes lightly traded issues that skew the final value from extant market conditions. This is so as these lightly traded issues do not accurately reflect the term structure of interest rates as other investment criteria, e.g., tax implications, control their market price.

There has also been a significant need for a hedging instrument on fixed income investing. In this context, an investor might purchase a portfolio of long term bonds that are sensitive to small changes in interest rates; to hedge this investment, this investor would enter a futures contract to sell instruments at a specific date in the future. Alternatively and more desirably, the hedge could be made with an index corresponding to a defined set of securities. This is not practical with the presently available indices due to their reliance on a broad spectrum of securities in the defining basket; this precludes effective utilization of these indices as a basis for trading futures or option contracts.

From the above, it is apparent that there remains a substantial void in the credit markets and a corresponding need for a real time barometer of the fixed income securities marketplace for the evaluation of portfolio performance, the trends and current market conditions, and the trading of indexed future and option contracts for fixed income securities.

SUMMARY AND OBJECTS OF THE PRESENT INVENTION

It is, therefore, an object of the present invention to provide a system for selectively reducing a substantial amount of market data into a simplified index instrument for use to measure the characteristics of the credit markets associated with the trading of fixed income securities.

It is also an object of the present invention to provide a system for collecting in real time information on current market activity in fixed income securities and processing this information to quantify the term structure of interest rates in real time.

It is another object of the present invention to provide an apparatus for the select processing of several types of data wherein data is qualified prior to use and translating the qualified data into a term structure of interest rates for a hypothetical portfolio of predetermined fixed income securities.

It is still another object of the present invention to provide a system for generating a real time barometer of the fixed income market and delineating an index value associated with a basket of fixed income securities for use in support of automated trading in futures and options contracts.

The above and other objects of the present invention are realized in a specific illustrative data processing system for the compilation of large quantities of disparate market data into discrete data files of varying reliability. The data is thereafter qualified and then processed to calculate on an iterative basis the term structure of interest rates in real time for a defined cross-section of the fixed income securities marketplace. These values are then used to price a select, specifically delineated portfolio of fixed income securities having varying terms to bridge an appreciable cross-section of the active market in fixed income securities. The forgoing portfolio is characterized in terms of an index value having a current market price (discount or premium from par), a true yield to maturity value (YTM) and a quantified duration. As market conditions change, the processor selectively updates some or all of the governing securities and based thereon modifies the index pursuant to a pre-established criteria.

In accordance with the varying aspects of the present invention, the system further includes an automated trading module for receiving market qualified buy and sell instructions for futures and options contracts tied to the basket of securities forming the index.

DESCRIPTION OF THE DRAWINGS

The foregoing features and benefits associated with the present invention may be more fully appreciated pursuant to the following detailed discussion of a specific embodiment thereof, taken in conjunction with the Figures appended hereto, wherein.

DESCRIPTION OF THE PRESENT INVENTION

Figure 1:
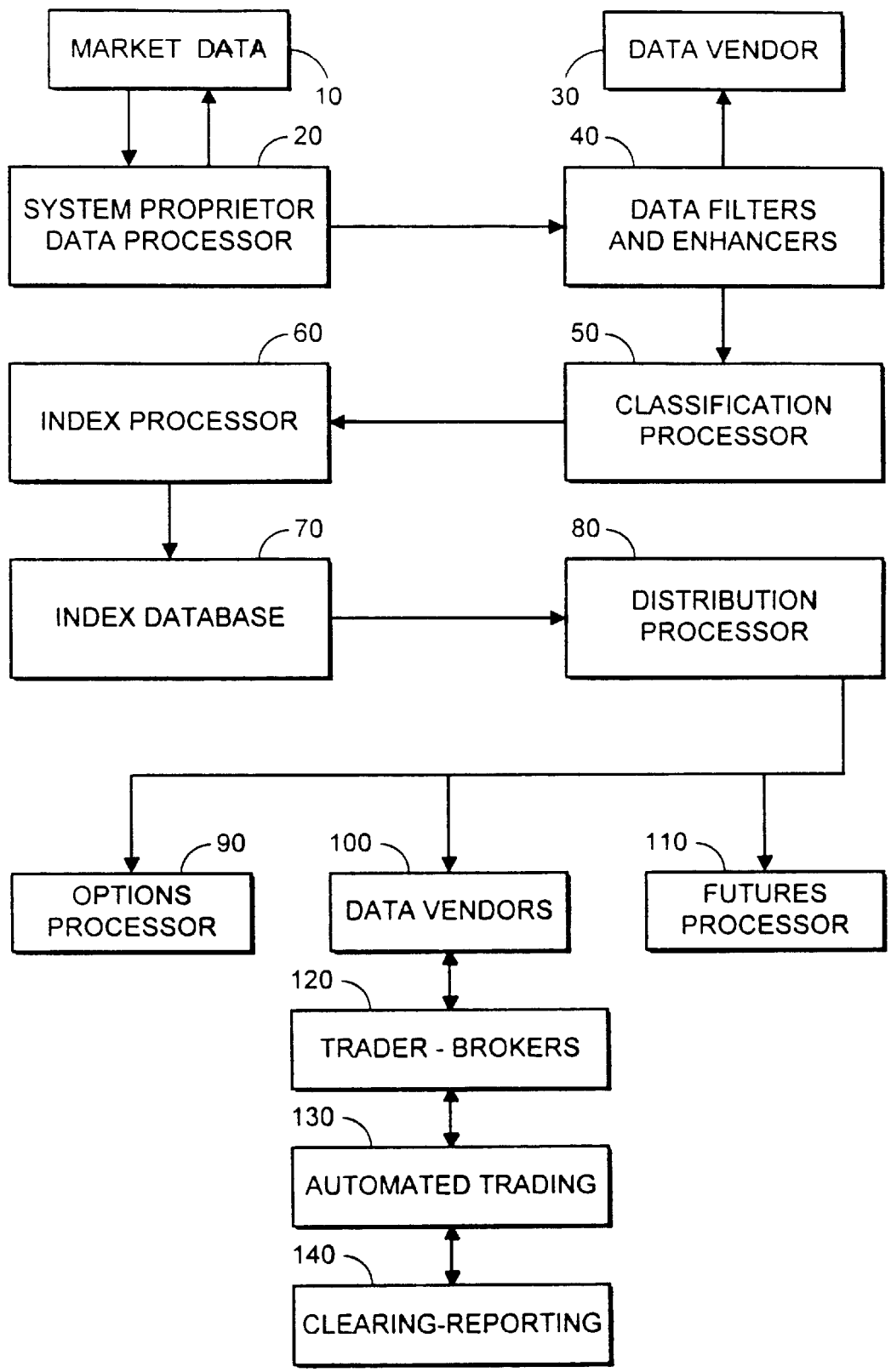
FIG. 1 is a functional block diagram of the discrete components forming the network associated with the present invention.

Turning now to FIG. 1, the overall information paths of the present invention are presented in block diagram form. Beginning with block 10, market data is collected from a plurality of on-line terminals operated by traders within the relevant bond market sector. A continual exchange of information flows between the traders, depicted in block 10, and the system proprietor, block 20, i.e., as bids, offers and trades are transacted in real time. This information is collected by the system proprietor and entered into the data processor database.

On-line market data is then transferred to the data filter and enhancer module, block 40, which acts to clarify and articulate the continuous incoming market data for use, e.g., by data vendors, block 30. One aspect of the data enhancer operation will be the conversion of on-line trading information into digital form for transmission to the classification processor, block 50. The operation of the classification processor is directed to creating a data set in proper format for further manipulation. This includes the generation of a coordinated array of data in matrix format.

Once properly formatted, the on-line market data is then transmitted to the index processor, block 60, for determination of a real time index value. This information is then loaded into the index database, block 70, and then passed to the distribution processor, block 80.

The foregoing operation will result in the final real time index value in terms of portfolio price, portfolio yield to maturity (YTM) and portfolio duration for distribution within the fixed income investment community. In the context of the present invention, three segments of this community are provided with the data. At block 90, system proprietors involved in automated options processing are provided the index values for quantifying and closing specific options positions pursuant to the trading of option contracts on the indexed portfolio. In a similar manner, at block 110, the portfolio index data is provided to system proprietors regarding futures contracts to permit proper transactions in closing of future contracts based on the portfolio index.

The third channel of distribution for the portfolio index data is to the data vendors supplying the aforementioned index information, at block 100. This is followed by the continual distribution of the index values to traders and brokers within the investment community, block 120, the support of automated trading, block 130, and finally declaring and reporting functions associated with such trading, block 140.

Figure 5:
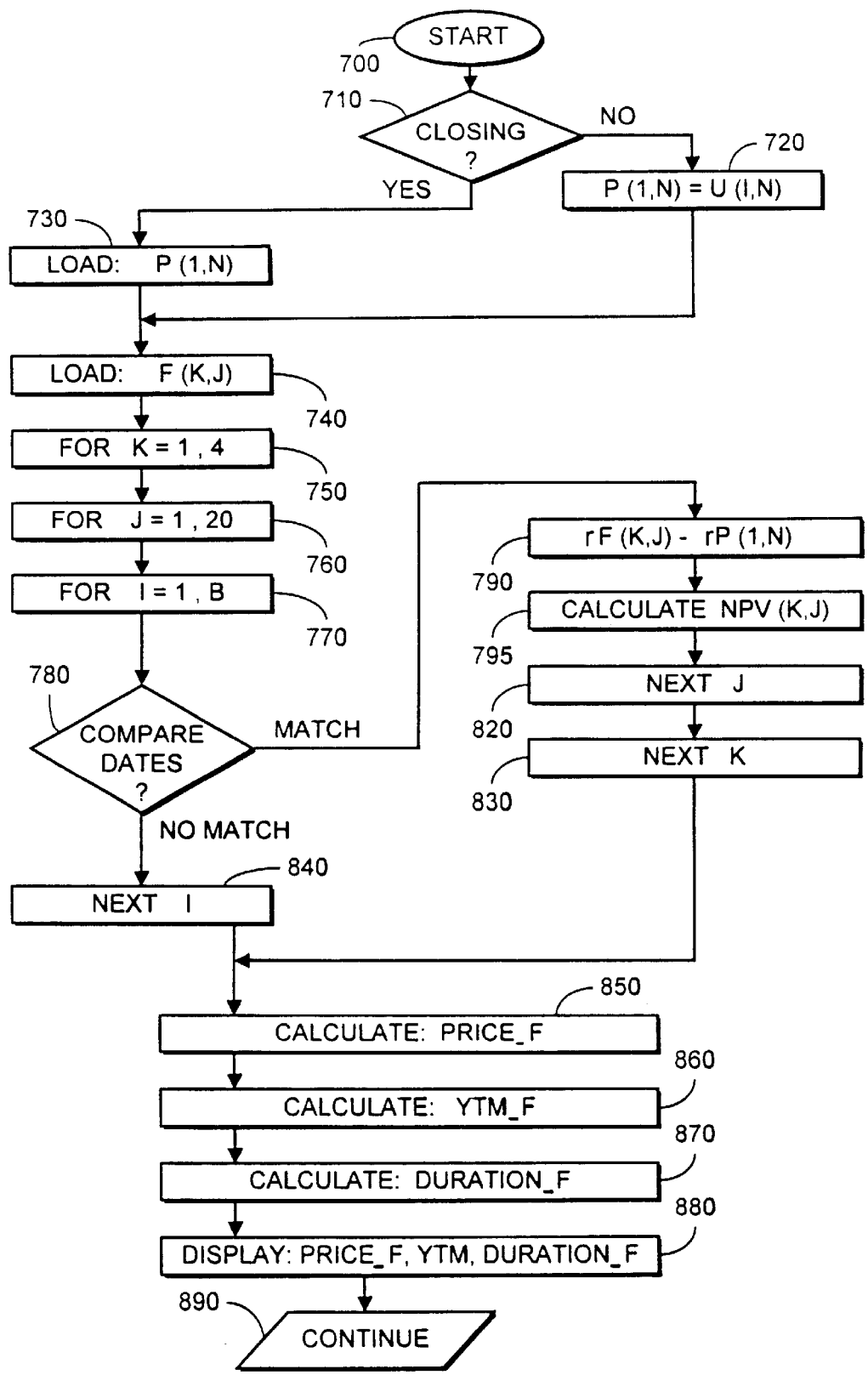
FIG. 5 is a logic flow chart depicting the processing associated with the determination and distribution of the Index Value.
Figure 6:
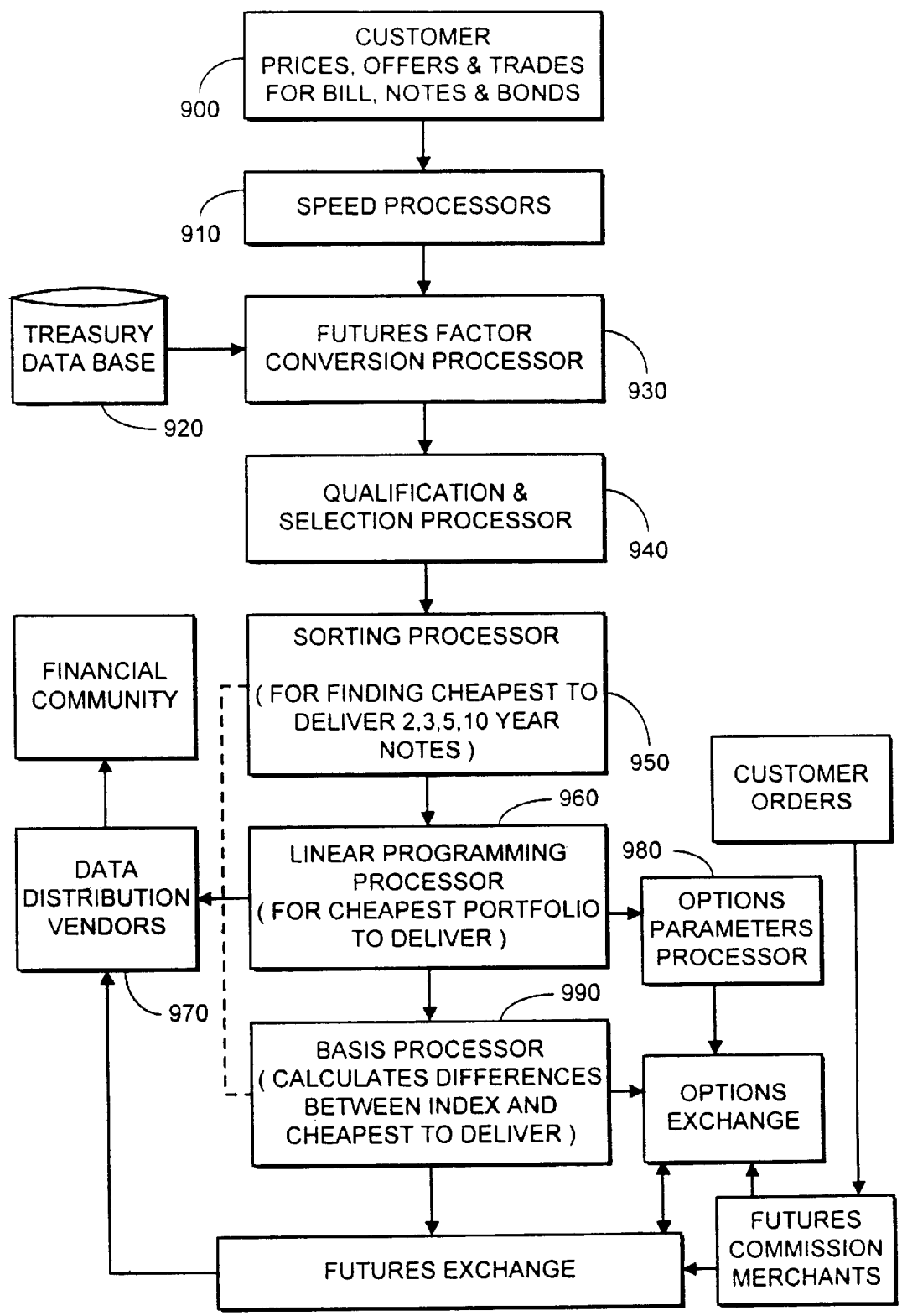
FIG. 6 is a logic flow chart depicting the information flow associated with managing futures/options transactions providing a least expensive portfolio of securities for delivery.

The above-identified processing modules for receiving market data and calculating a portfolio index based thereon are governed by a systems controlled program. As illustrated hereinbelow, this program is exemplified by several discrete modules for inter alia the selection and qualification of incoming data (FIG. 2), the determination of the term structure of interest rates (FIG. 3), updating the term structure with current price information (FIG. 4), the determination of the portfolio index characteristics based on the real time computer generated rate structure (FIG. 5), and the support of automated futures options transactions (FIG. 6).

First briefly in overview, the term structure determination is a math-intensive operation directed to the solution of multiple relationships comprising a like number of unknown quantities. These relationships involve the determination of the net present value of a future cash flow based on current information regarding the date of the future cash flow and current pricing.

Often, the data set is incomplete; therefore, the system employs interpolation techniques to provide missing points in the term spectrum. As provided below, the missing elements will invariably be close in time (e.g., within six months) of valid data points. This permits the use of linear interpolation for bridging missing data points with a reasonable degree of accuracy.

During the updating phase, the new price data will often reflect significant market movement, but will not displace the entire data set. The present invention, therefore, employs the use of pivot points, i.e., the updated values of price are used to "pivot" the entire term structure, including securities that have not been updated.

Once the real time term structure is characterized, the system quantifies a generic portfolio of securities comprising the following elements:

TABLE I

| Term (yrs.) | Coupon % | Face Value |
|---|---|---|
| 2 | 5 | $250,000 |
| 3 | 5-½ | $250,000 |
| 5 | 6 | $250,000 |
| 10 | 7 | $250,000 |

This portfolio of four U.S. treasury notes has a total value of $1M, a duration of approximately 4.2 years and a yield to maturity of almost 6.25 when the four notes are each priced at par.

The foregoing portfolio is then market priced based on the current term structure previously calculated. The portfolio value is then presented in terms of an average par value (e.g., 104) with YTM and duration values. This index is particularly useful in tracking the treasury market, measuring portfolio performance and governing select futures/options contract trading.

With the foregoing brief dissertation, an illustrated implementation is presented hereinbelow.

The first operation involves the qualification of the incoming market data transmitted to the system. This is accomplished via the logic structure depicted in FIG. 2. Logic conceptually begins at block 200 and proceeds to block 210, initiating the index variable loop assigning memory address locations for incoming price data, block 220. The first operation is to determine whether incoming data represents "closing" figures associated with the end-of-day trading (i.e., fixed in time). A positive response to test 230 branches logic to block 240 wherein a first matrix of price information is formatted from the incoming closing data. In the context of the present example, this closing data could represent the final price information received on a daily basis from the United States Federal Reserve for the United States Treasury market. As this information represents a complete set of price data at a fixed point in time, it is labeled "P" for proper, block 250.

Assuming a negative response to test 230, logic continues to test 270 wherein the instant transaction is qualified as an active (most recently auctioned issue) treasury. A positive response to test 270 branches to block 280. At block 280, the current transaction data is assigned into the matrix of data values for actives A(I, N). Alternatively, a negative response to test 270 bypasses block 280 and the security will remain in the X(I, N) file set.

The next sequence of operation involves data qualification. More particularly, as the system receives an incoming stream of price information for plural securities, it must discern the validity and quality of the data on an instantaneous basis. This incoming data will include both bid and ask quotes for a given security and possibly a transaction price. The filters within the system for data screening purposes are fluid to the extent that practice and historical results will influence the relative weight given any filter factor. For example, during initial operation all actives will be considered good data so that a sizable database may be quickly accumulated. At some subsequent time, an active filter criteria may be employed to enhance the overall quality of the ensuing models generated from the actives.

Figure 2:
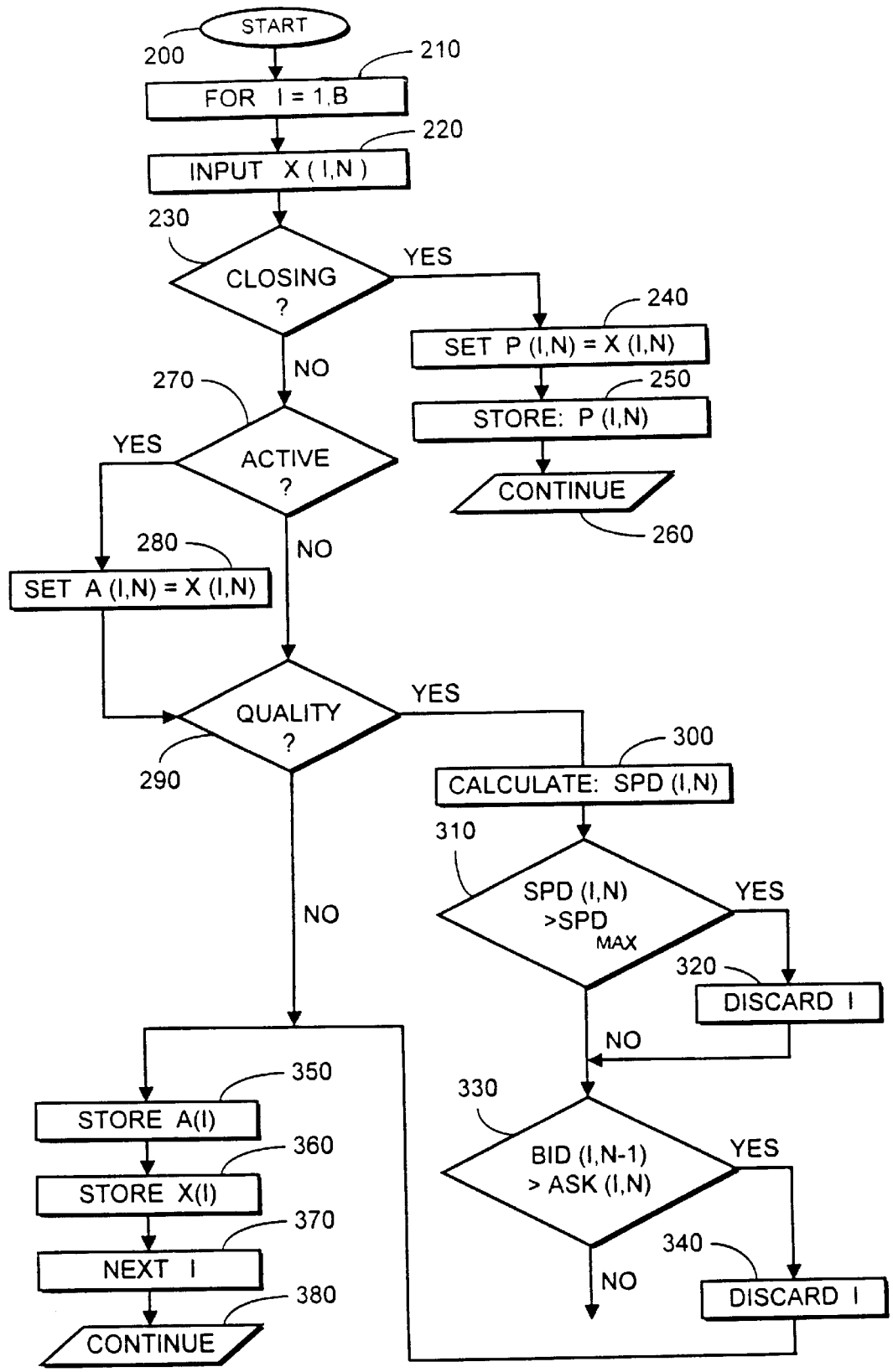
FIG. 2 is a logic flow chart depicting the processing path for the data acquisition and qualification module of the present invention.

Continuing with FIG. 2, test 290 queries whether a given security requires qualification. A positive response branches logic to block 300, where the first criteria applied involves measuring the spread between the bid and ask price currently quoted, SPD(I, N). At test 310, the current spread for that security is compared with a preset price spread maximum value, $SPD_{max}$. This preset spread limit is adjustable and may be initially set at 5/32; i.e., a difference between bid and ask sides of the market of 5/32. A positive response to test 310, branches to block 320 wherein the system discards the price information for that security. This data is removed from the data set because such a wide spread reflects unusual market conditions for that security.

A second criteria for retaining data involves comparing current bid/ask pricing with recent bid/ask pricing for differing securities. For example, if the current ask price of a given security is less than a recent bid price of the same or analogous security, this reflects a rapid shift in market conditions rendering the recent data unreliable. This process is depicted in test 330, which is performed after performing block 320 or after a negative response to test 310, with a positive response branching to block 340 for the removal of the disqualified data.

The remaining data sets are thereafter stored in matrix address format. After removing disqualified data at block 340, determining a negative response to test 330, or determining a negative response to test 290, at block 350, the active data is stored at A(I) and, at block 360, the inactive data is stored at matrix address X(I). This is repeated for each security on the data set via next command, at block 370, and continues in real time via block 380. In fact, except for the closing data, most, if not all, incoming transactions will be received on an asynchronous basis thereby creating a fluid database for processing in connection with the following logic commands.

The first phase of system operation is directed to the preparation of the term structure of interest rates at a pre-selected time. By definition, the term structure provides a set of spot rates sufficient to price a given note based on the note price data, the coupon rate and coupon payment cycle. Assuming a note with five remaining coupons, the term structure and associated spot rates corresponding with the five coupon dates and the current price data provide the requisite information to set up the N equations with N unknowns—in this case N=5—for simultaneous solution. The actual underlying mathematics is well known and explained in text materials, such as *Strategic Fixed Income Investment* by Thomas S. Y. Ho, Dow Jones-Irwin Homewood, Ill. 60430, the contents of which are hereby incorporated by reference as if restated in full.

The necessity of actual data multiplies as the number of securities increases with a corresponding number of simultaneous equations for solution. As the data needs increase, a data filter must be established to confirm the viability of select data entry. This process is depicted in detail in FIG. 2. As presented therein, a complete set of data is available at select times associated with market closing, etc. This is exemplified by the closing price data released by the Federal Reserve for the securities traded each day.

Taking the closing data as the starting data set, the entire term structure can be established spanning, e.g., ten years. Generating this term structure and the associated spot rates is accomplished in accordance with the functions depicted in FIG. 3. In this context, spot rate is the market established rate of interest to a given maturity date in the future, e.g., the date associated with a coupon payment. This spot rate is required for the determination of the net present value (NPV) of the future coupon payment given today's market conditions. As will be seen, the price of a given note is the sum of the NPVs of each of its coupons and the NPV of the final return of principal at maturity.

Figure 3:
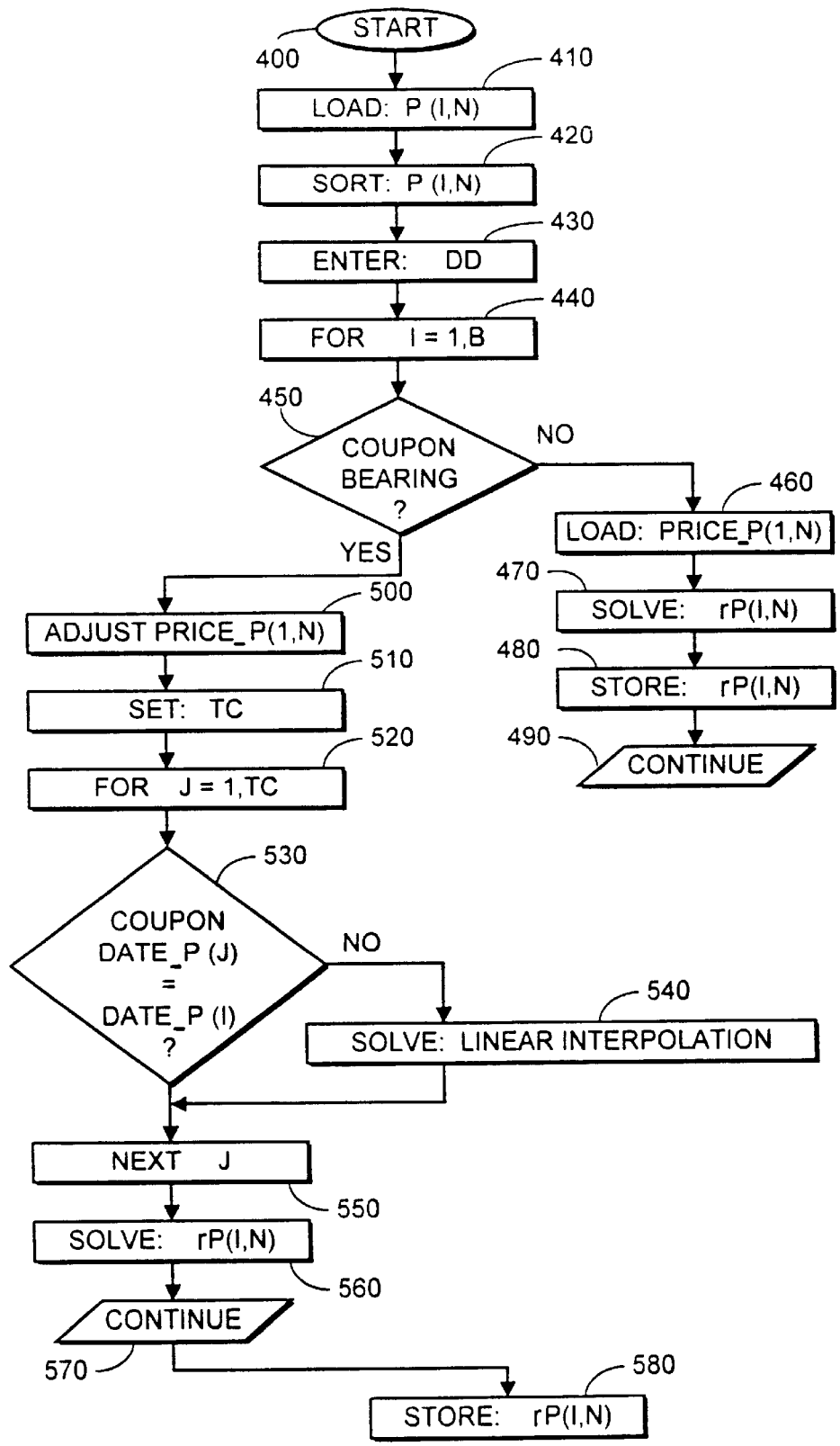
FIG. 3 is a logic flow chart depicting the processing logic for the determination of the present term structure of interest rates based on the current qualified data matrix.

Turning now to FIG. 3, logic conceptually begins at block 400, proceeding to block 410 for the accessing of the final closing numbers of a set of relevant securities, i.e., the final Fed data on the treasuries for that day. This set of data will include bid, ask and trade price data for each security actively marketed during the day. The system couples this data with the underlying biographies for each security creating a proper set of data that provides the coupon dates, coupon rate, remaining coupons, and maturity date, stored in matrix form at P(I, N), wherein I is the security ID counter and N is a date/time counter.

The table of variables used in the following flow diagrams is depicted hereinbelow:

TABLE

| | |
|---|---|
| Date_X (I) = | maturity date of X (I) |
| Coupon_X (I) = | coupon rate for X (I) |
| Coupon Date_X (I, J) = | date of Jth coupon for X (I) |
| rX (I) = | spot rate to date_X (I) |
| Discount_X (I) = | discount rate of X (I) |
| P = | subset X (proper) |
| U = | subset X (updates) |

The proper set P, of data provides all the information required to set up and solve the simultaneous equations to define the term structure of interest rates spanning these securities. The first processing step is the sort operation, block 420, which arranges the security database P(I, N) by maturity date, i.e, earlier maturing securities are prioritized. At block 430, the delivery date, DD is entered and logic then proceeds via loop command 440 to test 450. At this stage, the system determines whether the security is coupon bearing; it not (e.g., a T-bill), logic branches to block 460 for accessing price information for the security. To solve for the spot rate, two equations are set up for the security price. These equations are presented below:

$$\text{Price\_P}(I) = 100 - 100 \frac{(\text{Date\_P}(I) - DD)}{(360)} \text{Discount\_P}(I) \quad (1)$$

$$\text{Price\_P}(I) = \frac{100}{(_xY)} \quad (2)$$

wherein $$X = 1 + \frac{rP(I)}{2}; \text{ and}$$

$$Y = \frac{\text{Date\_P}(I) - DD}{(\text{Coupon Date\_P}(I, N+1) - \text{Coupon Date\_P}(I, N))};$$

100 is the face value of the security; and 360 is the convention for the number of days in a year for a T-bill security.

By setting these two price equations equal to each other, the spot rate defined by this security can be determined:

$$rP(I) = 2 * \left( \left( \frac{1}{1 - \frac{(\text{Date\_P}(I) - DD)}{360} * \text{Discount\_P}(I)} \right)^Z \right)_{-1} \quad (3)$$

wherein $$Z = 1/Y$$

For T-bills, no coupons exist, thus simplifying the above relationship. The calculated spot rate is solved at block 470 and then stored at block 480; logic then proceeds to the next security I+1 via continue command at block 490.

Assuming a positive response to test 450, the security is coupon bearing and logic proceeds to block 500, et seq., for the discounting of the security and all of its associated coupons for the spot rate determination. The first step is to adjust the security price for accrued interest associated with the next coupon payment. This is accomplished with the following relationship:

$$\text{Price\_P}(I) = \text{Price\_P}(I) + \frac{A \cdot \text{Coupon\_P}(I)}{2} \qquad (4)$$

wherein

A=[D−Coupon Date P(I,N)]/[Coupon Date_P(I,N+1)− Coupon Date_P(I,N)]

At block 510, the system sets the number of remaining coupons associated with the instant security TC to act as a counter for the iterative ensuing processing. This is initiated by loop command 520, block 525 and test 530. At block 525 and test 530, the system determines whether the coupon date associated with the instant security matches the maturity date of a security in the P(I, N) database. If so, the spot rate for that coupon is calculated, as above, using the price data at block 535; if a match is not found with an existing maturing security, the system logic branches to block 540 and interpolates from existing maturity dates on either side of the coupon date. The use of linear interpolation is a reasonable approximation, as the maximum length of time between maturing securities is six months.

After performing the operations at blocks 535 or 540, this process is repeated for each value of J, via block 550, and then the resultant data is used to calculate the spot rate for the Ith security, rP(I, N), at block 560. This is repeated for the entire set of securities from the closing price data, at block 570, and stored for subsequent use, at block 580.

Use of closing data from the Federal Reserve provides a complete set of data at a set point in time. After time, it becomes stale and needs to be updated rapidly with incoming asynchronous data on current transactions taking place in the market. This is accomplished via the flow path depicted in FIG. 4. Logic conceptually begins at start block 600 and inputs the data for the set of qualified actives in real time (i.e., within seconds of actual changes in a security price in terms of offer, bid and trade values) at block 610. The data for the actives A(I, N) is compared at test 620 to the existing proper set P(I, N−1) for the previous time cycle (N−1) to discern whether new information is available on an existing security. If yes, logic branches to block 630 and the new price data is used to update the spot rate for that security, via block 640.

Assuming a negative response to test 620 as no new data is received for a given member of the proper set, logic branches to block 650 for use of proximate securities having new price data as pivot points to recalculate the spot rate for the security without updated information, block 660. More particularly, the spot rate of the security that has not been updated is calculated as a convex combination of the two nearest spot rates for which there is new (updated) information. The updated spot rate data is used to complete the data set, block 670.

The spot rate data set, as continuously updated with new trading information, is used to price a generic portfolio of select securities as expressed in terms of price relating to par, yield to maturity (YTM) and duration. This is accomplished for the exemplary portfolio described above by the logic path presented in FIG. 5. Logic conceptually begins at start block 700, followed by test 710, which determines whether the data set is closing or updated continuously; if closing (yes to test 710), logic proceeds to block 730 and the proper closing data on the term structure is used. If asynchronous (no to test 710), the update set of data is used, block 720.

In either event, the previous index values for the portfolio are loaded, block 740, and then iteratively processed with the new market data. More particularly, the system iteratively determines the net present value for each of the four generic securities in the portfolio, via the counter in block 750, including each coupon, via the counter in block 760, by correlating the coupon and maturity dates for the generic issues with the data set for spot rates, via the counter in block 770; if a match occurs via test 780, the matching spot rate in the data set is used to calculate the NPV of the coupon, blocks 790 and 795. This is repeated for each coupon, J, via block 820, and each generic security in the portfolio, K, via block 830. If no match is found at test 780, the system tries the next security, via block 840.

Once the NPV is set for all of the components in the portfolio, the system calculates the portfolio price, block 850, the yield to maturity, YTM_F, block 860, and the portfolio duration, block 870. This information is displayed and made available to the associated network as an index, updated in real time by current price data, in a manner analogous to the S & P 500 and Dow Jones 30 Industrials at block 880.

In a separate aspect of the present invention the foregoing index is used as the measure of current valuation in support of a futures market based on an underlying portfolio for the index. Through an interconnected data network augmented with access to centralized brokers by telephone connection, the system offers automated electronic executions of futures and options contracts on the index for, e.g., treasury notes and their corresponding cash security equivalents.

By viewing through vendors in real time the price and yield of the portfolio, index traders, investors, pension fund managers, and other participants make determinations of market valuations of the duration sized portfolio. In so doing, bid, offer and execution decisions are implemented instantaneously by traders. These decisions are enacted through computer terminals that are interconnected through international data networks and processors to effectuate in real time the display of quantities for bids and offers and the "hitting" and "taking" of those bids and offers which then result in an executed trade. These trades are then electronically displayed and distributed to a clearing processor and at the same time to data vendors for redistribution to the worldwide financial community.

One function of the futures transaction processor is the determination of the least expensive portfolio of securities deliverable pursuant to a futures contract at the delivery date. Futures contracts based on the index determined above will require delivery of a combination of securities having 2, 3, 5 or 10 year maturities that, in combination, match the index duration and further comprise at most 50% of any one issue (e.g. 3 year notes). Given this criteria, at the delivery date, the system scans the market for 2, 3, 5 and 10 year notes, testing each combination of current issues to provide the least expensive matching combination and providing a delineation of the least expensive combination.

The system attributes described above may be more clearly understood in the context of the flow chart depicted in FIG. 6. Beginning with block 900, the system collects in real time the market positions of participating fixed income security traders as expressed in their various bid, offer and trade price data. This information is collated and conformed to a common format, block 910, and coupled with the existing treasury database, block 920, to discern a futures conversion factor, block 930.

The first operation is to organize the data into respective maturities that are associated with the specific index governing the futures contract obligations. This is represented by the selection processor, block 940. The data for each class of securities, i.e., 2, 3, 5 and 10 year maturities, is then sorted by price delineating the least expensive note within each class, block 950. The linear programming module, block 960, uses the sorted collection of notes in a minimalization algorithm that searches by trial and error for the least expensive portfolio that conforms to the delivery requirements of the futures contract.

The least expensive portfolio data is distributed three ways; first it is provided through the data vendors, block 970, to the financial community. It is also directed to the options parameter processor, block 980, for support of the transactions on the various options exchanges. The least expensive portfolio data is finally processed forming a "basis" quantifying the difference between the least expensive portfolio and the index value, block 990. This information is likewise distributed to the various market participants and exchanges as diagrammed. In this manner, the actual real time index and least expensive portfolio values support the trading in futures and options contracts, with current valuation and delivery expense determinations.

The above-described arrangement is merely illustrative of the principles of the present invention. Numerous modifications and adaptations thereof will be readily apparent to those skilled in the art without departing from the spirit and scope of the present invention.

What is claimed is:

1. A method of determining an index value in terms of a notional fixed-income related instrument, the method using market data for other instruments, the method comprising:
    calculating a value for each of the other instruments from market data related to market conditions for the other instruments;
    calculating a price or a yield of the notional fixed income related instrument using the values for the other instruments;
    providing or utilizing an electronic futures market for the trading of futures contracts based on the notional fixed-income related instrument;
    electronically executing a trade of the futures contracts; and
    electronically distributing in real time executed trade information relating to the executed trade to at least one of a) a clearing processor b) data vendors and c) market participants.

2. The method of claim 1, further comprising settling the futures contracts based on the notional fixed-income related instrument.

3. The method of claim 1, further comprising determining the delivery expense of the futures contracts based on the notional fixed-income related instrument.

4. A method of determining an index value in terms of a notional fixed-income related instrument, the method using market data for other instruments, the method comprising:
    calculating a value for each of the other instruments from market data related to market conditions for the other instruments;
    calculating a price or a yield of the notional fixed income related instrument using the values for the other instruments;
    providing or utilizing an electronic options market for the trading of options contracts based on the notional fixed-income related instrument;
    electronically executing a trade of the options contracts; and
    electronically distributing in real time executed trade information relating to the executed trade to at least one of a) a clearing processor b) data vendors and c) market participants.

5. The method of claim 4, further comprising settling the options contracts based on the notional fixed-income related instrument.

6. The method of claim 4, further comprising determining the delivery expense of the options contracts based on the notional fixed-income related instrument.

7. A method of determining an index value in terms of a notional fixed-income related instrument, the method using market data for another instrument, the method comprising:
    calculating a value for the other instrument from market data related to market conditions for the other instruments;
    calculating a price or a yield of the notional fixed income related instrument using the value for the other instrument;
    providing or utilizing an electronic futures market for the trading of futures contracts based on the notional fixed-income related instrument;
    electronically executing a trade of the futures contracts; and
    electronically distributing in real time executed trade information relating to the executed trade to at least one of a) a clearing processor b) data vendors and c) market participants.

8. The method of claim 7, further comprising settling the futures contracts based on the notional fixed-income related instrument.

9. The method of claim 7, further comprising determining the delivery expense of the futures contracts based on the notional fixed-income related instrument.

10. A method of determining an index value in terms of a notional fixed-income related instrument, the method using market data for another instrument, the method comprising:
    calculating a value for the other instrument from market data related to market conditions for the other instruments;
    calculating a price or a yield of the notional fixed income related instrument using the value for the other instrument;
    providing or utilizing an electronic options market for the trading of options contracts based on the notional fixed-income related instrument;
    electronically executing a trade of the options contracts; and
    electronically distributing in real time executed trade information relating to the executed trade to at least one of a) a clearing processor b) data vendors and c) market participants.

11. The method of claim 10, further comprising settling the options contracts based on the notional fixed-income related instrument.

12. The method of claim 10, further comprising determining the delivery expense of the options contracts based on the notional fixed-income related instrument.

13. A method of determining an index value in terms of a notional fixed-income related instrument, the method using market data for another instrument or instruments, the method comprising:
    calculating a value for each of the other instrument or instruments from market data related to market conditions for the other instrument or instruments;
    calculating a price or a yield of the notional fixed income related instrument using the values for the other instrument or instruments;

providing or utilizing an electronic market for the trading of the notional fixed-income related instrument;

electronically executing a trade of the notional fixed-income instrument; and electronically distributing in real time executed trade information relating to the executed trade to at least one of a) a clearing processor b) data vendors and c) market participants.

14. The method of claim 13, further comprising settling a trade of the instrument or instruments based on the notional fixed-income related instrument.

15. A system for electronically trading futures contracts or options contracts based on a notional fixed-income related instrument, the system comprising:

a plurality of computer terminals;

data network or data networks;

processors; and wherein the plurality of computer terminals are coupled by the data network or data networks to the processors, and wherein the plurality of computer terminals are adapted to display quantities of futures or options contracts for bids and offers relating to the notional fixed-income related instrument, the value of the notional fixed-income related instrument being based on the value of another instrument, the value of the notional fixed-income related instrument being expressed in terms of a price or a yield, the processors being adapted to execute a trade of the futures or options contracts.

16. The system of claim 15, wherein at least one of the processors is adapted to distribute in real time executed trade information relating to an executed trade to at least one of a) a clearing processor b) data vendors and c) a market participant.

17. A method of determining an index value in terms of a notional fixed-income related instrument, the method using market data for other instruments, the method comprising:

calculating a value for each of the other instruments from market data related to market conditions for the other instruments;

calculating a price or a yield of the notional fixed income related instrument using the values for the other instruments;

providing or utilizing an electronic futures market for the trading of futures contracts based on the notional fixed-income related instrument;

electronically executing a trade of the futures contracts; and electronically distributing in real time executed trade information relating to the executed trade to a clearing processor.

18. The method of claim 17, further comprising settling the futures contracts based on the notional fixed-income related instrument.

19. The method of claim 17, further comprising determining the delivery expense of the futures contracts based on the notional fixed-income related instrument.

20. A method of determining an index value in terms of a notional fixed-income related instrument, the method using market data for other instruments, the method comprising:

calculating a value for each of the other instruments from market data related to market conditions for the other instruments;

calculating a price or a yield of the notional fixed income related instrument using the values for the other instruments;

providing or utilizing an electronic options market for the trading of options contracts based on the notional fixed-income related instrument;

electronically executing a trade of the options contracts; and electronically distributing in real time executed trade information relating to the executed trade to a clearing processor.

21. The method of claim 20, further comprising settling the options contracts based on the notional fixed-income related instrument.

22. The method of claim 20, further comprising determining the delivery expense of the options contracts based on the notional fixed-income related instrument.

23. A method of determining an index value in terms of a notional fixed-income related instrument, the method using market data for another instrument, the method comprising:

calculating a value for the other instrument from market data related to market conditions for the other instruments;

calculating a price or a yield of the notional fixed income related instrument using the value for the other instrument;

providing or utilizing an electronic futures market for the trading of futures contracts based on the notional fixed-income related instrument;

electronically executing a trade of the futures contracts; and electronically distributing in real time executed trade information relating to the executed trade to data vendors.

24. The method of claim 23, further comprising settling the futures contracts based on the notional fixed-income related instrument.

25. The method of claim 23, further comprising determining the delivery expense of the futures contracts based on the notional fixed-income related instrument.

26. A method of determining an index value in terms of a notional fixed-income related instrument, the method using market data for another instrument, the method comprising:

calculating a value for the other instrument from market data related to market conditions for the other instruments;

calculating a price or a yield of the notional fixed income related instrument using the value for the other instrument;

providing or utilizing an electronic options market for the trading of options contracts based on the notional fixed-income related instrument;

electronically executing a trade of the options contracts; and electronically distributing in real time executed trade information relating to the executed trade to a clearing processor.

27. The method of claim 26, further comprising settling the options contracts based on the notional fixed-income related instrument.

28. The method of claim 26, further comprising determining the delivery expense of the options contracts based on the notional fixed-income related instrument.

29. A method of determining an index value in terms of a notional fixed-income related instrument, the method using market data for another instrument or instruments, the method comprising:
- calculating a value for each of the other instrument or instruments from market data related to market conditions for the other instrument or instruments;
- calculating a price or a yield of the notional fixed income related instrument using the values for the other instrument or instruments;
- providing or utilizing an electronic market for the trading of notional fixed-income instrument;
- electronically executing a trade of the notional fixed-income instrument; and
- electronically distributing in real time executed trade information relating to the executed trade to data vendors.

30. The method of claim 29, further comprising settling a trade of the instrument or instruments based on the notional fixed-income related instrument.

31. A system for electronically trading futures contracts or options contracts based on a notional fixed-income related instrument, the system comprising:
- a plurality of computer terminals;
- data network or data networks;
- processors; and
- wherein the plurality of computer terminals are coupled by the data network or data networks to the processors, and wherein the plurality of computer terminals are adapted to display quantities of futures or options contracts for bids and offers relating to the notional fixed-income related instrument, the value of the notional fixed-income related instrument being based on the value of another instrument, the value of the notional fixed-income related instrument being expressed in terms of a price or a yield, the processors being adapted to execute a trade of the futures or options contracts and wherein at least one of the processors is adapted to distribute in real time executed trade information relating to an executed trade to a clearing processor.

32. A method of determining an index value in terms of a notional fixed-income related instrument, the method using market data for other instruments, the value for the other instruments being calculated from market data related to market conditions for the other instruments, a price or a yield for the notional-fixed income related instrument being calculated using values for the other instruments, the method comprising:
- providing or utilizing an electronic futures market for the trading of futures contracts based on the price or yield of the notional fixed-income related instrument; and
- electronically executing a trade of the futures contracts based on the price or the yield of the notional fixed income related instrument.

33. The method of claim 32 further comprising electronically distributing in real time executed trade information relating to the executed trade to at least one of a) a clearing processor b) data vendors and c) market participants.

34. The method of claim 32, further comprising settling the futures contracts based on the price or yield of the notional fixed-income related instrument.

35. The method of claim 32, further comprising determining the delivery expense of the futures contracts based on the price or yield of the notional fixed-income related instrument.

36. A method of determining an index value in terms of a notional fixed-income related instrument, the method using market data for other instruments, the value for the other instruments being calculated from market data related to market conditions for the other instruments, a price or a yield for the notional-fixed income related instrument being calculated using values for the other instruments, the method comprising:
- providing or utilizing an electronic options market for the trading of options contracts based on the notional fixed-income related instrument; and
- electronically executing a trade of the options contracts based on the price or yield of the notional fixed-income related instrument.

37. The method of claim 36 further comprising electronically distributing in real time executed trade information relating to the executed trade to at least one of a) a clearing processor b) data vendors and c) market participants.

38. The method of claim 36, further comprising settling the options contracts based on the price or yield of the notional fixed-income related instrument.

39. The method of claim 36, further comprising determining the delivery expense of the options contracts based on price or yield of the notional fixed-income related instrument.

40. A method of determining an index value in terms of a notional fixed-income related instrument, the method using market data for other instruments, the value for the other instruments being calculated from market data related to market conditions for the other instruments, a price or a yield for the notional-fixed income related instrument being calculated using values for the other instruments, the method comprising:
- providing or utilizing an electronic futures market for the trading of futures contracts of the notional fixed-income related instrument; and
- electronically executing a trade of the futures contracts based on the price or yield of the notional fixed-income related instrument.

41. The method of claim 40, further comprising settling the futures contract based on the notional fixed-income related instrument.

42. The method of claim 40, further comprising determining the delivery expense of the futures contracts based on the notional fixed-income related instrument.

43. The method of claim 40 further comprising electronically distributing in real time executed trade information relating to the executed trade to at least one of a) a clearing processor b) data vendors and c) market participants.

44. A method of determining an index value in terms of a notional fixed-income related instrument, the method using market data for other instruments, the value for the other instruments being calculated from market data related to market conditions for the other instruments, a price or a yield for the notional-fixed income related instrument being calculated using values for the other instruments, the method comprising:
- providing or utilizing an electronic options market for the trading of options contracts based on the notional fixed-income related instrument; and
- electronically executing a trade of the options contracts.

45. The method of claim 44, further comprising settling the options contracts based on the notional fixed-income related instrument.

46. The method of claim 44, further comprising determining the delivery expense of the options contracts based on the notional fixed-income related instrument.

47. The method of claim 44, further comprising electronically distributing in real time executed trade information relating to the executed trade to at least one of a) a clearing processor b) data vendors and c) market participants.

48. A method of determining an index value in terms of a notional fixed-income related instrument, the method using market data for other instruments, the value for the other instruments being calculated from market data related to market conditions for the other instruments, a price or a yield for the notional-fixed income related instrument being calculated using values for the other instruments, the method comprising:

providing or utilizing an electronic market for the trading of the notional fixed-income instrument;

electronically executing a trade of the notional fixed-income instrument based on the price or yield of the notional fixed income instrument; and electronically distributing in real time executed trade information relating to the executed trade to at least one of a) a clearing processor b) data vendors and c) market participants.

49. The method of claim 48, further comprising settling a trade of the instrument or instruments based on the price or yield of the notional fixed-income related instrument.

* * * * *

UNITED STATES PATENT AND TRADEMARK OFFICE
CERTIFICATE OF CORRECTION

PATENT NO. : 6,754,639 B2
APPLICATION NO. : 09/225537
DATED : June 22, 2004
INVENTOR(S) : Philip Myron Ginsberg It is certified that error appears in the above-identified patent and that said Letters Patent is hereby corrected as shown below:

Item (56), References Cited, FOREIGN PATENT DOCUMENTS, "EP 04 434 877" should be --EP 0434877--.

Item (56), References Cited, OTHER PUBLICATIONS, add --"Dow Jones Stoxx Index Guide," STOXX, pp. 1-43, Version 7.1 (March 2002).
"Guide to the Volatility Indices of Deutsche Börse," Deutsche Börse, pp. 1-18, Version 1.4 (May 2002).
"Guide to Dow Jones Global Titans 50 Index," pp.1-11, (June 2002).
"Guide to the Dow Jones Asian Titans 50 Index," pp.1-10, (June 2002).
"Guide to Dow Jones Sector Titans 30 Index," pp.1-8, (June 2002).
"Guide to the Bond Indices of Deutsche Börse," Deutsche Börse, pp. 1-25, Version 3.4, (July 2002).
"Guidelines to Deutsche Börse's Equity Indices," Deutsche Börse - iBoxx Indices, pp. 1-39, Version 4.6, (September 2002).
"Guidelines to the BayX30* Bavarian Equity Index," Deutsche Börse, pp. 1-25, Version 2.0, (September 2002).
"Guide to the iBoxx € Benchmark Indices," Deutsche Börse - iBoxx Indices, pp. 1-35, Version 2.01,(October 2002).
"Guide to the iBoxx € Liquid Indices," Deutsche Börse - iBoxx Indices, pp. 1-40, Version 1.0, (October 2002).
"Guide to iBoxx £ Benchmark Indices," Deutsche Börse - Iboxx Indices, pp. 1-58, Version 1.51 (October 2002).
"Dow Jones Stoxx Sustainability Indexes Guide," STOXX, pp. 1-44, Version 1.0 (October 2001).
"Statistics Guide," Deutsche Börse, pp. 1-24, Version 1.1, (October 1999).
"German Stock Index - DAX," <u>Deutsche Börse.</u>
"iBoxx € Benchmark Indices," <u>Deutsche Börse.</u>
"German Bond Index - REX," <u>Deutsche Börse.</u>
"German Volatility Index - VDAX," <u>Deutsche Börse.</u>
Rentenmarkt-Index: Mßstab für Trends und Erfolge Die Bank, Zeitschrift für Bankpolltik and Bankpraxis, Nr. 2, Februar 1984, (with translation).
Das Ende des Taschenrechners für den Rentenmarktindex FAZ Finanzmärke, Nr. 149, Seite 24, 01. Jull 1991, (with translation).
REX: Neue Maßzahl für den Rentenmarkt FAX Finanzmärk, Nr. 133, Selte 25, 12. Juni 1991, (with translation).

UNITED STATES PATENT AND TRADEMARK OFFICE
CERTIFICATE OF CORRECTION

PATENT NO. : 6,754,639 B2
APPLICATION NO. : 09/225537
DATED : June 22, 2004
INVENTOR(S) : Philip Myron Ginsberg It is certified that error appears in the above-identified patent and that said Letters Patent is hereby corrected as shown below:

Securities and Exchange Commission File No. S7-16-97 Available at
http://www.sec.gov/rules/concept/s71697/frankel.htm
"Trades modernized", The Financial Post(Toronto-Daily Edition), Section 1, News; World Business Briefs, (February 24, 1989), pp. 9.
"21st-century stockbroking; Switzerland's securities traders face an electronic future", SHZ Publications (Switzerland), No. 2, (March 1990), pp. 46.
"Bankers prepare for a change; Lausanne's financial sector faces a more competitive future", SHZ Publications (Switzerland), No. 6, (November 1990), pp. 37.
"Wiring the buy side; Electronic Joint Venture Partners L.P. UniVu turnkey systems for bond analytics services", Wall Street Computer Review, Vol. 8; No. 12 (September 1991), pp. 32.
"European Bourse Reform; Tax cuts to catch investor interest - Sweden aims to draw in more foreigners", Financial Times (London), Section I, (October 17, 1991), pp. 35.--.

Figure 4:
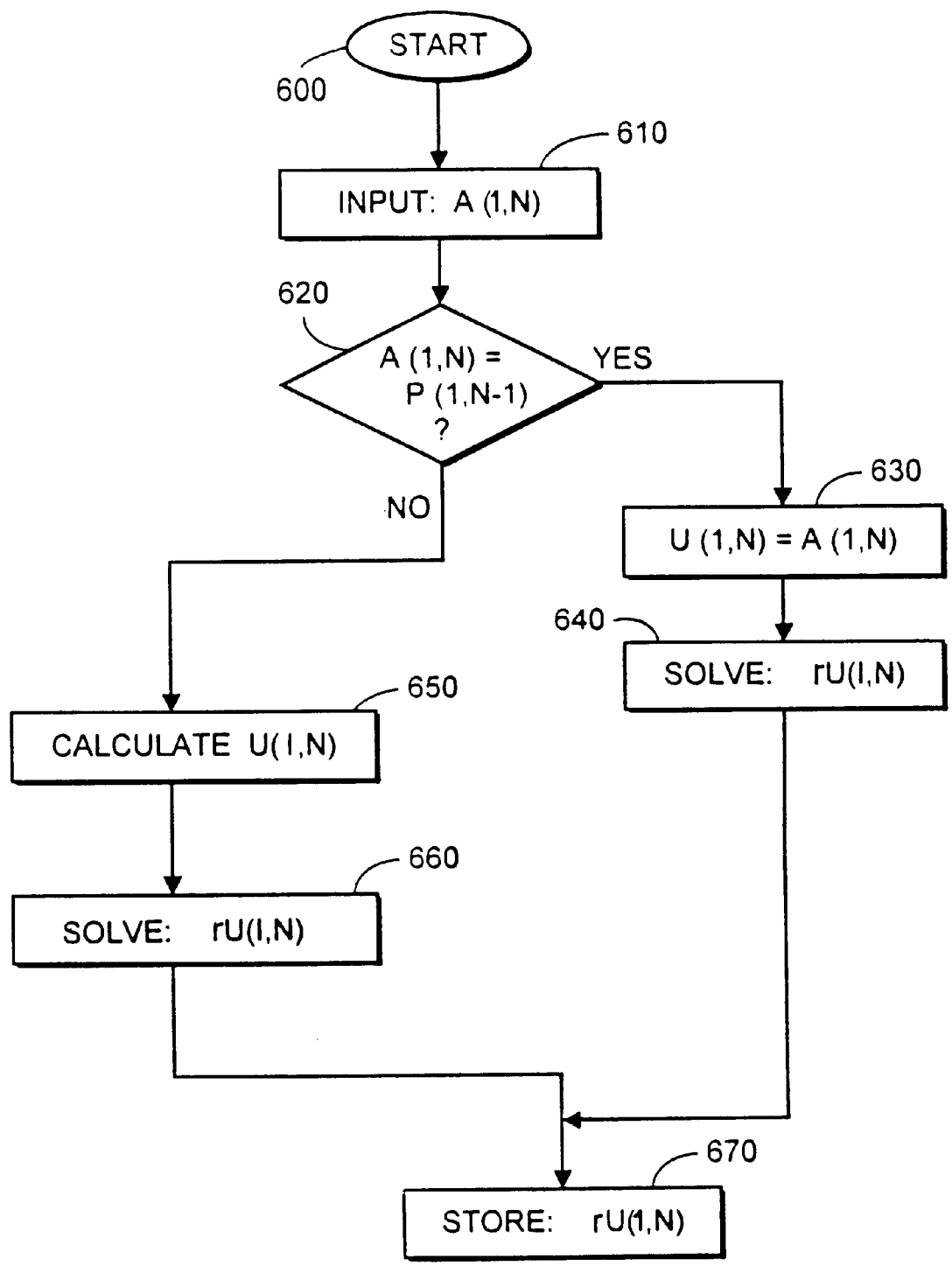
FIG. 4 is a logic flow chart depicting the real time update operation.

FIG. 2, delete reference numeral "260".
FIG. 2, move the "NO" indicator on test 310 from the right of the arrow connecting test 310 to test 330 to the left of that arrow.
FIG. 2, extend the arrow pointing downward from the bottom of test 330 so that it connects to the arrow connecting block 340 to block 350.
FIG. 3, in block 460, change "Price_P(1,N)" to --Price_P(I,N)--.
FIG. 3, in block 500, change "Price_P(1,N)" to --Price_P(I,N)--.
FIG. 3, delete the arrow connecting block 520 to test 530, add a block 525 between block 520 and test 530 that is labeled --COMPARE COUPON DATE_P(I,J) TO MATURITY DATES OF SECURITIES IN DATABASE--, add an arrow from block 520 to block 525, and add an arrow from block 525 to test 530.
FIG. 3, in test 530, change the text from "COUPON DATE_P(J)=DATE_P(I)?" to --DOES COUPON DATE MATCH A MATURITY DATE--.
FIG. 3, delete the arrow connecting test 530 and block 550, and connect the arrow from block 540 directly to block 550.
FIG. 3, add a block 535 near the lower left of test 530 that is labeled --CALCULATE COUPON SPOT RATE--, add an arrow coming out of the left side of test 530 that is going into the top of block 535 and that is labeled --YES--, and add an arrow coming out of the bottom of block 535 that is going into the left side of block 550.
FIG. 4, in block 610, change "A(1,N)" to --A(I,N)--.
FIG. 4, in test 620, change "A(1,N)=P(1,N-1)" to --A(I,N)=P(I,N-1)--.
FIG. 4, in block 630, change "U(1,N)=A(1,N)" to --U(I,N)=A(I,N)--.
FIG. 4, in block 670, change "rU(1,N)" to --rU(I,N)--.
FIG. 5, in block 720, change "P(1,N)" to --P(I,N)--.

UNITED STATES PATENT AND TRADEMARK OFFICE
CERTIFICATE OF CORRECTION

PATENT NO. : 6,754,639 B2
APPLICATION NO. : 09/225537
DATED : June 22, 2004
INVENTOR(S) : Philip Myron Ginsberg It is certified that error appears in the above-identified patent and that said Letters Patent is hereby corrected as shown below:

FIG. 5, in block 730, change "P(1,N)" to --P(I,N)--.
FIG. 5, in block 790, change "rF(K,J)- rP(1,N)" to --rF(K,J)=rP(I,N)--.
FIG. 5, in block 880, change "YTM" to --YTM_F--.
FIG. 5, delete reference numeral "890".
FIG. 6, in block 900, change "PRICES" to --BIDS--.
FIG. 6, in block 910, change "SPEED PROCESSORS" to --COLLATE AND FORMAT--.

DESCRIPTION OF THE PRESENT INVENTION, column 8, line 35, "$X = 1 + \frac{rP(I);}{2}$ and"

should be --$X = 1 + \frac{rP(I);}{2}$--.

DESCRIPTION OF THE PRESENT INVENTION, column 9, line 6, "A = [D-Coupon Date P(I/N)]/[Coupon Date_P(I,N+1)-Coupon Date_P(I,N))]" should be --A = [DD-Coupon Date P(I/N)]/[Coupon Date_P(I,N+1)-Coupon Date_P(I,N))]--.

Claim 7, column 12, lines 11-12, "instruments" should be --instrument--.
Claim 10, column 12, lines 37-38, "instruments" should be --instrument--.
Claim 23, column 14, lines 24-25, "instruments" should be --instrument--.
Claim 26, column 14, lines 48-49, "instruments" should be --instrument--.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,754,639 B2 | Page 1 of 1 |
| APPLICATION NO. | : 09/225537 | |
| DATED | : June 22, 2004 | |
| INVENTOR(S) | : Philip Myron Ginsberg | |

It is certified that error appears in the above-identified patent and that said Letters Patent is hereby corrected as shown below:

On the title page Item (63), replace the "Related U.S. Application Data" as follows:
-- Continuation of application No. 08/853,931, filed May 9, 1997, now Pat. No. 5,857,176, which is a divisional of application No. 08/396,422, filed Feb. 28, 1995, now Pat. No. 5,774,880, which is a continuation of application No. 07/897,377, filed Jun. 10, 1992, now abandoned. --

Replace col. 1, lines 7-12 as follows:
-- This is a continuation of commonly assigned U.S. patent application Ser. No. 08/853,931, filed May 9, 1997, now U.S. Pat. No. 5,857,176, issued Jan. 5, 1999, which is a divisional of U.S. patent application Ser. No. 08/396,422, filed Feb. 28, 1995, now U.S. Pat. No. 5,774,880, issued Jun. 30, 1998, which is a file wrapper continuation of U.S. patent application Ser. No. 07/897,377, filed Jun. 10, 1992, now abandoned. --

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 6,754,639 B2  Page 1 of 1
APPLICATION NO. : 09/225537
DATED : June 22, 2004
INVENTOR(S) : Philip Myron Ginsberg It is certified that error appears in the above-identified patent and that said Letters Patent is hereby corrected as shown below:

On The Title Page Item (63), replace the "Related U.S. Application Data" as follows:
 -- Continuation of application No. 08/853,931, filed May 9, 1997, now Pat. No. 5,857,176, which is a divisional of application No. 08/396,422, filed Feb. 28, 1995, now Pat. No. 5,774,880, which is a continuation of application No. 07/897,377, filed Jun. 10, 1992, now abandoned. --

Replace col. 1, lines 7-12 as follows:
 -- This is a continuation of commonly assigned U.S. patent application Ser. No. 08/853,931, filed May 9, 1997, now U.S. Pat. No. 5,857,176, issued Jan. 5, 1999, which is a divisional of U.S. patent application Ser. No. 08/396,422, filed Feb. 28, 1995, now U.S. Pat. No. 5,774,880, issued Jun. 30, 1998, which is a file wrapper continuation of U.S. patent application Ser. No. 07/897,377, filed Jun. 10, 1992, now abandoned. --

Signed and Sealed this

Nineteenth Day of February, 2008

JON W. DUDAS
*Director of the United States Patent and Trademark Office*